No. 691,861. Patented Jan. 28, 1902.
E. HEMSTROM.
KNIFE.
(Application filed Nov. 8, 1901.)
(No Model.)
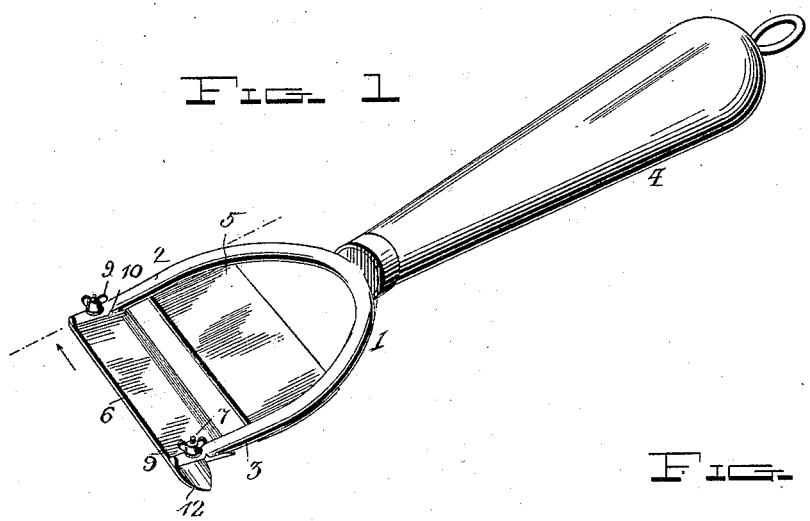
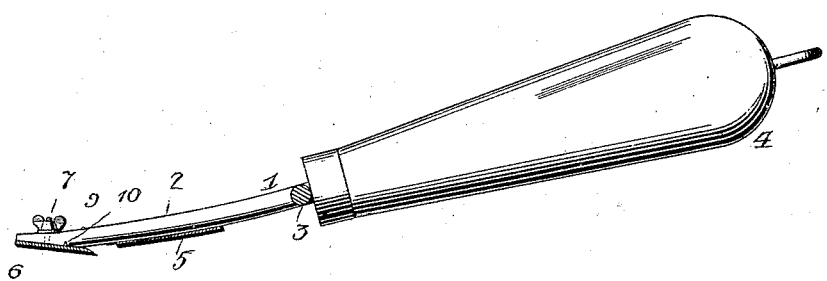
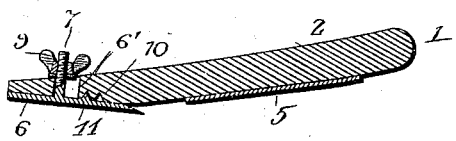
Inventor
Edward Hemstrom
Witnesses
By Attorneys

UNITED STATES PATENT OFFICE.

EDWARD HEMSTROM, OF GREATFALLS, MONTANA.

KNIFE.

SPECIFICATION forming part of Letters Patent No. 691,861, dated January 28, 1902.

Application filed November 8, 1901. Serial No. 81,603. (No model.)

*To all whom it may concern:*

Be it known that I, EDWARD HEMSTROM, a citizen of the United States, residing at Greatfalls, in the county of Cascade and State of Montana, have invented certain new and useful Improvements in Knives; and I do declare the following to be a full, clear, and exact description of the invention, such as will enable others skilled in the art to which it appertains to make and use the same.

The invention relates to a fruit or vegetable parer and slicer.

The object of the invention is to provide a device of this character which shall be simple of construction, durable in use, comparatively inexpensive of production, and the blade of which may be easily and quickly adjusted to regulate its depth of penetration and cut.

With this and other objects in view the invention consists of certain novel features of construction, combination, and arrangement of parts, which will be hereinafter more fully described, and particularly pointed out in the appended claim.

In the accompanying drawings, Figure 1 is a perspective view of the implement. Fig. 2 is a central longitudinal sectional view. Fig. 3 is a sectional view, on an enlarged scale, through one of the arms and the end of the blade, illustrating the manner of adjustably connecting the parts.

In the drawings, 1 denotes the frame of the implement, which consists of arms 2 and 3, preferably curved toward each other at their inner ends and joined together to form a bail and suitably pivoted to a handle 4.

5 denotes a gage-plate which is connected to the under side of the arms and extends entirely across the frame.

6 denotes the blade, which is adjustably secured to the arms at their forward ends in advance of the gage-plate. This adjustment is preferably effected by beveling the under side of the arms to give proper pitch or incline to the blade and forming said arms with longitudinal apertures 6', through which project screw-threaded studs 7 of the blade. Screwed upon the ends of these studs are thumb-nuts 9. In addition to being beveled the inner ends of these arms are provided with transverse teeth or serrations 10, which are adapted to receive upwardly-extending lips 11 of the blade, whereby when the thumb-nuts are screwed down tight these lip projections will be drawn up through the serrations or teeth, and thus firmly lock the blade in adjustment with respect to the gage-plate, whereby the thickness of the slices or parings may be regulated. If desired, I may provide one end of the blade with a gouging-point 12, which may be used for digging out the eyes of potatoes and other specks not reached by the blade in the act of paring.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In an implement of the character described, the combination with the frame having arms the under sides of which are beveled and provided with transverse serrations, said arms being provided with longitudinal slots, of a gage-plate secured to said arms, a blade having lips and screw-threaded studs, the former to engage the serrations and the latter to project through the longitudinal apertures, and thumb-nuts for adjustably connecting the plate to the arms, substantially as set forth.

In testimony whereof I have hereunto set my hand in presence of two subscribing witnesses.

EDWARD HEMSTROM.

Witnesses:
 CHAS. WEGNER,
 EUGENE PRIOR.